United States Patent
Smith, III

(10) Patent No.: US 7,377,555 B2
(45) Date of Patent: May 27, 2008

(54) UNDERSEA CONDUIT COUPLING WITH PASSAGEWAY GATE

(75) Inventor: Robert E. Smith, III, Missouri City, TX (US)

(73) Assignee: National Coupling Company, Inc., Stafford, TX (US)

( * ) Notice: Subject to any disclaimer, the term of this patent is extended or adjusted under 35 U.S.C. 154(b) by 515 days.

(21) Appl. No.: 11/133,639

(22) Filed: May 20, 2005

(65) Prior Publication Data
US 2006/0263009 A1 Nov. 23, 2006

(51) Int. Cl.
*F16L 37/28* (2006.01)
*F16L 25/00* (2006.01)
*F16L 29/00* (2006.01)

(52) U.S. Cl. ............... 285/317; 285/394; 285/304; 251/149.3

(58) Field of Classification Search ......... 285/307, 285/314, 317, 358, 394, 26, 29, 91, 304, 285/922; 251/149.3, 149.7
See application file for complete search history.

(56) References Cited

U.S. PATENT DOCUMENTS

| | | | | | |
|---|---|---|---|---|---|
| 389,335 | A | * | 9/1888 | Spear | 403/328 |
| 856,401 | A | * | 6/1907 | Hannold | 285/317 |
| 2,245,151 | A | * | 6/1941 | Martinet | 285/7 |
| 2,413,106 | A | * | 12/1946 | Kelle | 285/304 |
| 2,750,828 | A | * | 6/1956 | Wendling | 81/125 |
| 2,851,295 | A | * | 9/1958 | Chaffee | 403/328 |
| 3,070,129 | A | * | 12/1962 | Poulallion et al. | 138/89 |
| 3,272,538 | A | * | 9/1966 | Bergstrom | 285/231 |
| 3,472,530 | A | * | 10/1969 | Fowler | 285/3 |
| 3,773,360 | A | * | 11/1973 | Timbers | 285/307 |
| 4,026,605 | A | * | 5/1977 | Emmerich | 299/107 |
| 4,138,148 | A | * | 2/1979 | Zaremba | 285/317 |
| 4,289,295 | A | | 9/1981 | Allread | |
| 4,298,218 | A | * | 11/1981 | Britch | 285/3 |
| 4,298,220 | A | * | 11/1981 | Kukuminato | 285/148.26 |
| 4,357,037 | A | * | 11/1982 | Oetiker | 285/314 |
| 4,557,261 | A | * | 12/1985 | Rugheimer | 604/533 |
| 4,576,359 | A | * | 3/1986 | Oetiker | 251/149.6 |
| 4,694,859 | A | * | 9/1987 | Smith, III | 137/614.04 |
| 5,083,588 | A | | 1/1992 | Truchet | |
| 5,083,818 | A | * | 1/1992 | Schoot | 285/81 |

(Continued)

FOREIGN PATENT DOCUMENTS

GB 701734 7/1952

OTHER PUBLICATIONS

"Patents Act 1977: Search Report under Section 17" received in corresponding Great Britain application No. GB0609675.4; Dated Aug. 1, 2006.

*Primary Examiner*—James M. Hewitt
(74) *Attorney, Agent, or Firm*—Wong, Cabello, Lutsch, Rutherford & Brucculeri, LLP

(57) ABSTRACT

A coupling for tubular goods having male and female coupling halves adapted to provide a straight-through conduit path when joined together. In a preferred embodiment, the male member has a sliding gate which opens automatically when the coupling halves are mated and closes off the central passageway automatically when the coupling halves are separated. The gate prevents debris from entering the central passageway when the coupling is de-mated. This is a particular advantage in undersea environments. The coupling may include seals for providing a fluid-tight connection between the male and female members.

20 Claims, 3 Drawing Sheets

U.S. PATENT DOCUMENTS

| | | | |
|---|---|---|---|
| 5,100,256 A * | 3/1992 | Estep ......................... 403/328 |
| 5,143,347 A * | 9/1992 | Lee et al. ................. 251/149.6 |
| 5,165,439 A | 11/1992 | Krynicki |
| 5,676,402 A * | 10/1997 | Eley et al. ..................... 285/61 |
| 5,829,480 A * | 11/1998 | Smith, III .............. 137/614.04 |
| 5,845,943 A * | 12/1998 | Ramacier et al. ............. 285/12 |
| 5,906,245 A * | 5/1999 | Tibbitts et al. ............... 175/426 |
| RE36,771 E * | 7/2000 | Carlson ....................... 285/305 |
| 6,179,002 B1 * | 1/2001 | Smith, III .............. 137/614.04 |
| 6,202,691 B1 * | 3/2001 | Smith, III .............. 137/614.04 |
| 6,626,465 B2 * | 9/2003 | Lacroix et al. ................ 285/80 |
| 6,840,548 B2 * | 1/2005 | Lacroix ....................... 285/308 |

* cited by examiner

UNDERSEA CONDUIT COUPLING WITH PASSAGEWAY GATE

CROSS-REFERENCE TO RELATED APPLICATIONS

None

BACKGROUND OF THE INVENTION

1. Field of the Invention

This invention relates to underwater couplings for joining sections of tubular goods. More particularly, it relates to underwater couplings for conduits used for electrical or fiber optic cables.

2. Description of the Related Art

Offshore petroleum exploration and production is an increasingly important part of the energy industry. As the sophistication of the process grows, there is an increasing need for data communication and the exchange of control signals between surface facilities (e.g., a drilling platform or a production platform) and equipment on the ocean floor or within the well bore. So-called "smart wells" have sensors within the well and/or well head which send data relating to the status of the well to the operator monitoring the well's performance. Hydraulic lines are often used for control purposes. Electrical cables are typically used to transmit data. However, in the marine environment, a leak in an electrical cable almost always results in a short circuit due to the high conductivity of sea water. Accordingly, data transmission using fiber optic cables offers a significant advantage. A fiber-optic system is similar to the copper wire system that it replaces. The difference is that fiber-optics use light pulses to transmit information over thin strands of glass ("fibers") instead of using electronic pulses to transmit information through copper lines. Fiber-optic based systems offer advantages in: speed; bandwidth; the distance signals can be transmitted without needing to be "refreshed" or amplified; resistance to electromagnetic noise; and, maintenance needs.

Fiber optic connectors have traditionally been the biggest concern in using fiber optic systems. The ideal interconnection of one fiber to another would have two fibers that are optically and physically identical held by a connector or splice that squarely aligns them on their center axes. However, in the real world, system loss due to fiber interconnection is a factor. A connector should align the fibers on their center axes, but when one fiber's axis does not coincide with the other fiber's axis, lateral displacement occurs. A displacement of only 10% of the core axis diameter results in a loss of about 0.5 dB. Since the tiny core of an optical fiber is what transmits the actual light, it is imperative that the fiber be properly aligned with emitters in transmitters, photo-detectors in receivers and adjacent fibers in splices. This is the function of the optical connector. Because of the small sizes of fibers, the optical connector is usually a high precision device with tolerances on the order of fractions of a thousandth of an inch. Accordingly, system integrity is improved and costs are lowered when fiber optic connections and splices are minimized. Splicing is only needed if the cable runs are too long for one straight pull. Making a splice in fiber optic cable is many times more difficult and expensive if it must be made undersea. Accordingly, avoiding splices in fiber optic cable is of particular importance in the undersea environment.

One way of avoiding splices in a fiber optic cable is to place the cable in a conduit that covers the entire distance to be traversed. Couplings are used to join multiple sections of conduit to create a continuous passageway from the source to the destination. A single run of fiber optic cable can then be threaded through the conduit passageway without the need for splices. This technique requires couplings that provide a substantially straight path through the body of the coupling and an absence of features which might cause the cable to "hang up" as it passes through.

Fiber optic cable is often pulled for much longer distances than electrical cable. Continuous fiber pulls of over 4,000 feet are not extraordinary. These long pulls minimize the number of splices in fiber cable, which is desirable for fiber performance. The light weight of the cable makes these long pulls possible, although proper lubrication and a good conduit installation are also necessities. The placement of fiber optic cable in conduit is quite common. Conduit offers protection from crushing, environmental disruption, animals, and other environmental abuse, plus easier replacement or upgrade in the future.

Fiber optic cable can be threaded through a fluid-tight conduit by attaching a ball having a diameter approximately equal to the inner diameter of the conduit to the leading end of the cable. Fluid under pressure may then be pumped through the conduit and the ball acts as a piston within a cylinder (defined by the conduit walls), pulling the fiber optic cable through the conduit. The fluid may be selected or formulated to provide a lubricating action for the cable jacket sliding through the conduit. It will be appreciated that this method requires that sections of conduit be joined with fluid-tight couplings.

Sections of conduit for fiber optic cables, electrical cables and the like need to be joined together in such a way that a straight and smooth passageway through the coupling device results. This is because the cable, fiber or wire must usually be pulled or threaded through the conduit. Any discontinuity on the interior surface of the conduit presents the possibility of a snag. In the undersea environment, there is also a need to prevent marine organisms and debris from entering an open coupling. Conventional conduit couplings do not provide means for sealing the conduit when a coupling is open.

Hydraulic couplings in a variety of configurations are routinely used in off-shore petroleum exploration and production facilities. FIG. 1 is a cross-sectional view of one such coupling of the prior art. The couplings generally consist of a male member and a female member with connecting, sealed, fluid passageways. The female member generally is a cylindrical body with a relatively large diameter longitudinal bore at one end and a relatively small diameter longitudinal bore at the other. The small bore facilitates connections to hydraulic lines, while the large bore seals and slidingly engages the male member of the coupling.

The male member includes a cylindrical body with a probe section approximately equal to the diameter of the female member bore, and a connection at its other end to facilitate connection to hydraulic lines. When the probe section of the male member is inserted into the bore of the female member, according to various embodiments of the device, fluid flow is established between the male and female members.

Although hydraulic lines are most commonly formed of tubular material, the hydraulic couplings of the prior art are unsuited for joining lengths of tubular conduit. As is typical in such hydraulic couplings, both the male and female members have poppet valves which close automatically when the coupling halves are separated in order to keep hydraulic fluid from leaking out and seawater from leaking into the system. The nature of the poppet valves is such that the fluid flow path is not straight through the coupling, but is rather a tortuous path. Such a flow path is acceptable for hydraulic fluid, but unsuitable for a conduit through which a cable must be run. Examples of undersea hydraulic couplings are disclosed in U.S. Pat. No. 4,694,859 and U.S. Pat. No. 6,626,207 and U.S. Pat. No. 6,375,153.

What is needed is a conduit coupling suitable for use in the undersea environment that provides a straight-through passageway and automatic closure of the passageway when the coupling is decoupled. The present invention solves this problem.

BRIEF SUMMARY OF THE INVENTION

Male and female coupling halves are adapted to provide a straight-through conduit path when joined together. In a preferred embodiment, the male member has a sliding gate which opens automatically when the coupling halves are mated and closes off the central passageway automatically when the coupling halves are separated. The gate prevents debris from entering the central passageway when the coupling is de-mated.

BRIEF DESCRIPTION OF THE SEVERAL VIEWS OF THE DRAWING(S)

DETAILED DESCRIPTION OF THE INVENTION

Figure 1:
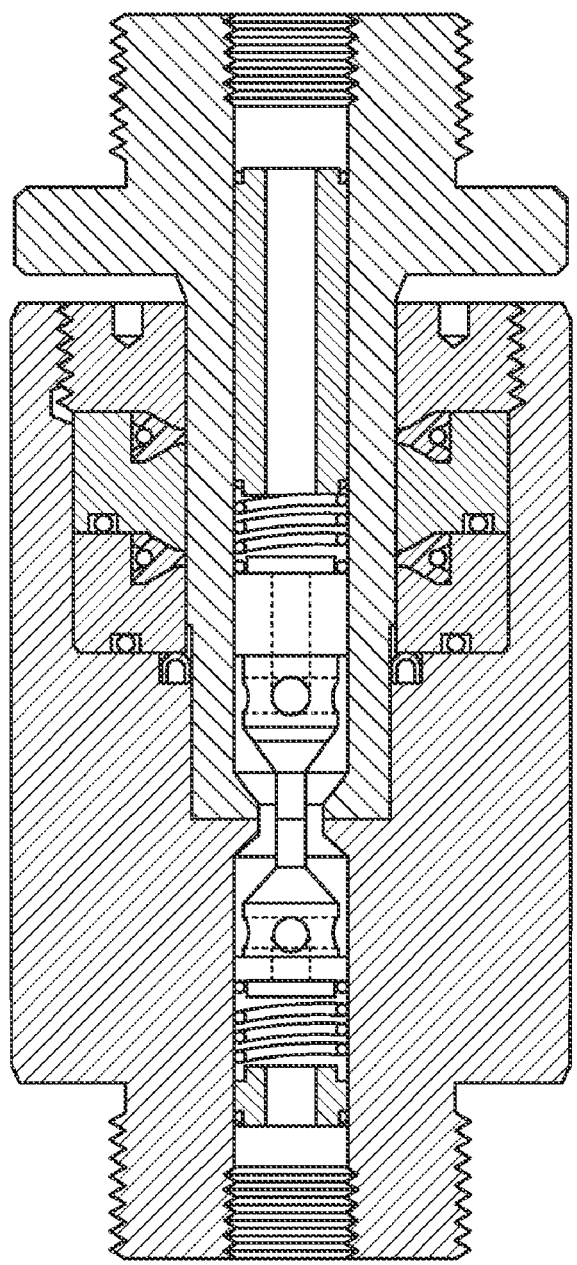
FIG. 1 is a cross-sectional view of an undersea coupling of the prior art.
Figure 2A:
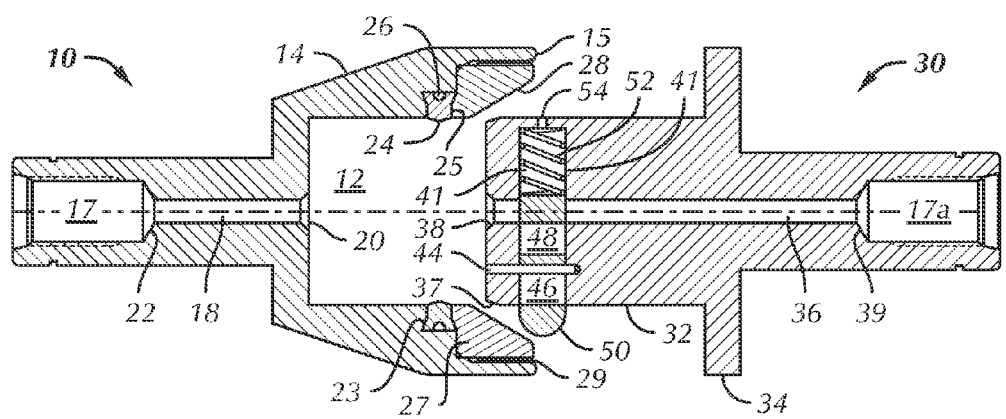
FIG. 2A is a cross-sectional view of a conduit coupling of the invention with the male and female halves de-mated.

Referring to FIG. 2A, a coupling according to the present invention is shown with the male and female coupling members de-mated. Female coupling member 10 may comprise a generally cylindrical body 14 having a central bore of various diameters which, in the illustrated embodiment, includes receiving chamber 12, tubing socket 17 and central flow passage 18 connecting socket 17 to receiving chamber 12.

Female coupling member 10 may further include radial seal 24 which is held in place on shoulder 23 by seal retainer nut 27. Seal retainer nut 27 may have threaded portion 29 for engagement with coupling body 14. Dovetail shoulders 23 and 25 together form a dovetailed circumferential groove on the interior surface of receiving chamber 12 for holding seal 24. Dovetail interlocks resist the inward radial force on the seal which results when a negative pressure is created in the receiving chamber as the male member is withdrawn. Without this feature (or its equivalent) elastomeric radial seals tend to implode into the receiving chamber when the face of the male member crosses the plane of the seal upon withdrawal. By way of example, radial seal 24 may be formed of an elastomer, a more rigid polymer such as a linear aromatic semi-crystalline polymer (e.g., polyetheretherketone (PEEK), a fluorocarbon (e.g., TEFLON) or the like. Seal 24 may also be a metal seal such as a pressure-energized ring seal. In the illustrated embodiment, seal 24 includes an outer circumferential groove for retaining O-ring 26 which seals between female coupling body 14 and radial seal member 24.

In the embodiment shown in FIG. 2, the transition in the central bore between socket 17 and central passage 18 comprises beveled surface 22. Similarly, the transition between central passage 18 and receiving chamber 12 comprises bevel 20. Such bevels reduce the likelihood that wires, tubes or fiber optic cables will hang-up on the shoulders between diameters when their ends are passed through the conduit coupling. However, these bevels are optional and embodiments having square-shouldered abutting passageways are within the scope of the invention.

Male coupling member 30 also comprises a generally cylindrical body 32 with a central bore having various diameters. Body 32 may comprise flange 34 for mounting male coupling member 30. Flange 34 may be dimensioned such that it contacts end 15 of female coupling member 10 when the male member is fully inserted into the receiving chamber 12 of female coupling half 10. Male member 30 may have tubing socket 17a for connecting male coupling half 30 to tubular goods (not shown).

In the embodiment shown in FIG. 2, the transition in the central bore between socket 17a and central passageway 36 comprises beveled surface 39. Similarly, the transition between central passage 36 and the opening of the central bore into receiving chamber 12 when the coupling is mated comprises bevel 38. Such bevels reduce the likelihood that wires, tubes or fiber optic cables will hang-up on the shoulders between diameters when their ends are passed through the conduit coupling.

Body 32 may also include beveled surface 37 which helps to center the probe of male member 30 during insertion into receiving chamber 12 of female member 10.

Body 32 of male member 30 may also include transverse bore 41 for containing sliding gate 40 and compression spring 52. Gate 40 is shown in orthogonal cross section in FIG. 3—i.e., the view of FIG. 3 is 90° to that of FIG. 2.

Gate 40 comprises slot 46 sized to fit retaining pin 44 in sliding engagement. Gate 40 also comprises opening 48 which, in the illustrated embodiment, is a circular opening of approximately the same diameter as that of flow passage 36. One end of gate 40 is rounded to form cam follower 50.

As shown in FIG. 2, gate 40 is held in transverse bore 41 by retaining pin 44. Retaining pin 44 acting within slot 46 also prevents rotation of gate 40 within bore 41. Gate 40 is sized to slide within bore 41 in response to the action of compression spring 52 and cam follower 50. When no force is applied to cam follower 50, compression spring 52 causes sliding gate 40 to move to the position shown in FIG. 2A. Movement of gate 40 out of bore 41 under the influence of spring 52 is restrained by retainer pin 44 contacting the terminus of slot 46. In this position—the closed position— solid portion 42 of gate 40 aligns with central passage 36, closing it off.

Figure 2B:
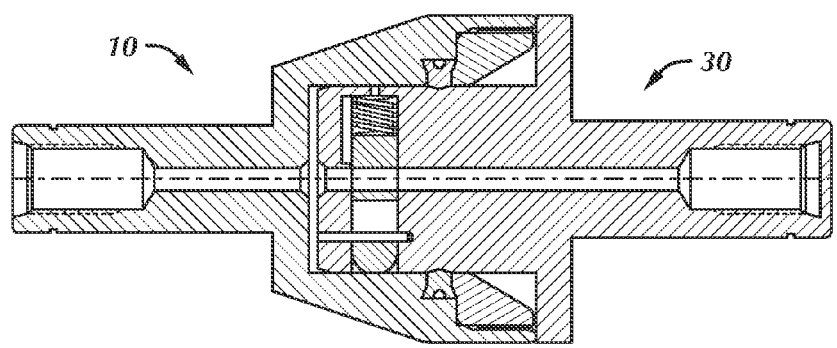
FIG. 2B is a cross-sectional view of the conduit coupling illustrated in FIG. 2A with the coupling halves fully mated.
Figure 3:
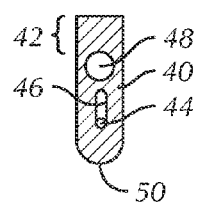
FIG. 3 is an orthogonal cross-sectional view of the sliding gate member which forms a part of the conduit coupling illustrated in FIGS. 2A and 2B.

In the embodiment shown in FIG. 2, seal retainer nut 27 includes cam surface 28. Cam surface 28 is sized and positioned such that when male member 30 is inserted into receiving chamber 12 of female member 10, cam follower 50 of gate 40 contacts cam surface 28 causing gate 40 to slide within bore 41, compressing spring 52. Gate 40 and cam follower 50 are sized such that when male member 30 is fully inserted into female member 10, opening 48 in gate 40 aligns with central passage 36 thereby providing a straight-through passageway from one end of the coupling to the other, as illustrated in FIG. 2B.

In similar fashion, when the coupling halves are separated (de-mated) one from another, spring 52 urges gate 40 to the closed position.

In one embodiment, gate 40 is designed to prevent debris from entering passage 36 when the coupling members are separated. In some undersea applications, this function may be adequately performed without gate 40 providing a fluid-tight, pressure-resistant seal. Accordingly, gate 40 may be formed of a polymer, a composite material such as a glass fiber reinforced polymer, or metal. TEFLON™ fluorocarbons and DELRIN™ acetal polymers are particularly preferred because they are self-lubricating and hence facilitate the sliding action of gate 40 within bore 41. Bleed hole 54 may be provided in transverse bore 41 for relieving fluid pressure within the bore (41) thereby preventing hydraulic lock. In some embodiments, however, the fit of gate 40 within bore 41 may have sufficient tolerance that bleed hole 54 is not required—i.e., fluid within the portion of bore 41 occupied by spring 52 may escape through the annulus surrounding gate 40 when gate 40 moves to the open position. In other embodiments, however, gate 40 and/or bore 41 may be adapted to provide a fluid-tight, pressure-resistant seal of central passage 36 by using seals and sealing methods well-known in the art.

Figure 4A:
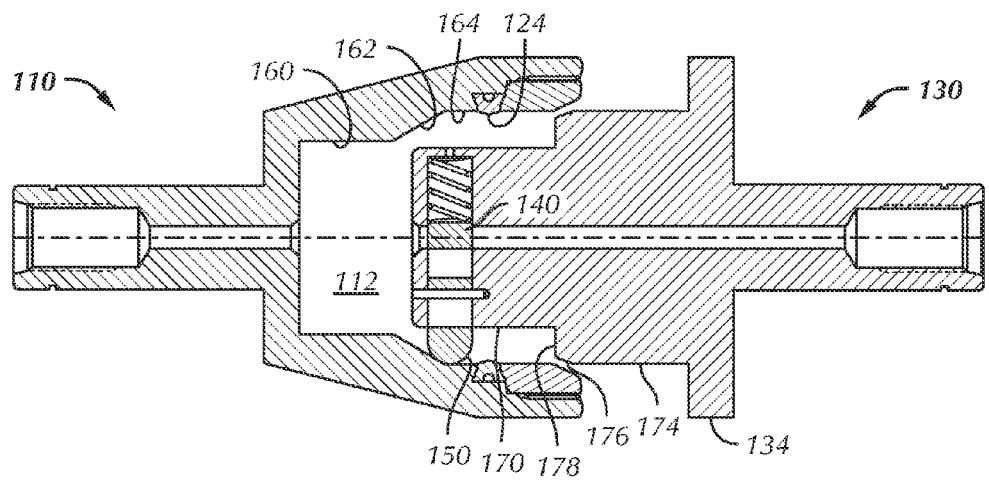
FIG. 4A is a cross-sectional view of a conduit coupling according to a second embodiment of the invention with the male and female halves de-mated.
Figure 4B:
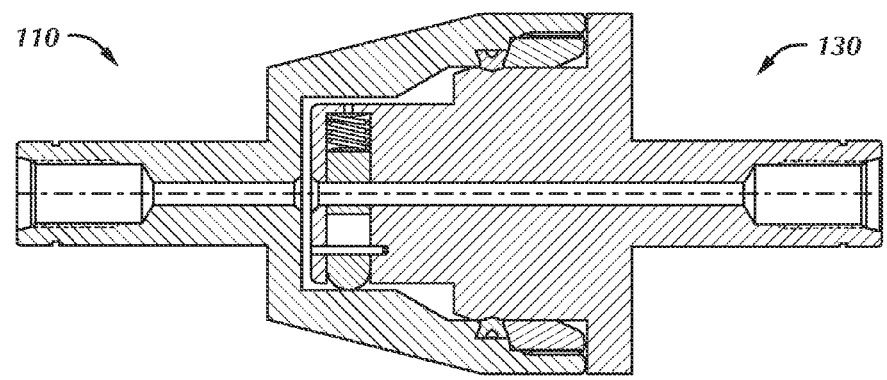
FIG. 4B is a cross-sectional view of the conduit coupling illustrated in FIG. 4A with the coupling halves fully mated.

An alternative embodiment of the invention is shown in FIGS. 4A and 4B. In this embodiment, receiving chamber 112 of female coupling member 110 has three sections: a first section having a first (smaller) diameter 160; a second section having a second (larger) diameter 164; and, a third section comprising a sloped transition 162 between the first and second diameters. The probe section of male coupling member 130 may have corresponding sections to provide a sliding fit into the receiving chamber 112 of female member 110—i.e., a section having a first (smaller) diameter 170 and a section having a second (larger) diameter 174 separated by shoulder 178. Shoulder 178 may have bevel 176 to assist in centering male member 130 upon insertion into female member 110.

Gate 140 is preferably located within the section of male coupling member 130 having smaller diameter 170. To extend the longevity of seal 124, diameters 164 and 174 are preferably chosen to ensure that cam follower 150 of gate 140 does not contact seal 124 during insertion or removal of male member 130 into or out of female member 110. Consideration should be given to the inner diameter of seal 124 and the travel of cam follower 150—i.e., the projection of cam follower 150 beyond diameter 170 when gate 140 is in the closed position.

In the embodiment illustrated in FIGS. 4A and 4B, sloped transition 162 on the interior wall of receiving chamber 112 acts as a cam for cam follower 150. As male member 130 is inserted into receiving chamber 112, gate 140 moves to the open position under the action of cam 150. When the coupling halves are disengaged, the action of spring 152 causes gate 140 to move to the closed position as cam follower 150 traverses sloped transition 162 between first diameter 160 and second diameter 164.

The embodiment of the invention shown in FIGS. 4A and 4B has the advantage of having cam follower 150 of gate 140 not contacting (and potentially damaging) seal 124 during mating and de-mating of the coupling. This is accomplished at the expense of a coupling of larger diameter as compared to the embodiment shown in FIG. 2. Seal 124 may be larger than seal 24 and have greater surface area contact with the probe section of the male coupling half. As a result, insertion and withdrawal forces may be higher.

Couplings according to the present invention are suitable for connecting tubular goods used to convey fluids as well as for conduits used to contain and protect cables, wires, fiber optic bundles, or even smaller-diameter tubes (e.g., capillary tubes) which may be used to convey other fluids, e.g., lubricants and scale inhibitors for electric submersible pumps ("ESPs"), specialty gasses, hydraulic fluid and the like.

Because conduit couplings must sometimes be mated underwater by divers or remotely operated vehicles ("ROVs"), it has been found that the mating process may be expedited by placing a plurality of couplings on opposing junction plates. The junction plates hold the couplings in position and are provided with means for securing the two plates in proximity one to another so as to maintain the individual couplings in a connected condition.

Male or female couplings may be provided on either plate, but it is typical to locate the male couplings on the fixed plate and the female couplings on the removable plate because the female couplings most often contain the sealing elements and it facilitates the replacement of those sealing elements by having them on a recoverable device—i.e., the plate holding the female members may be brought to the surface for maintenance operations.

The prior art describes various means for joining two junction plates. For example, U.S. Pat. No. 5,265,980 describes a junction plate assembly for a undersea structure having a connector shaft with external acme threads which mates with an internally threaded second junction plate. A handle is connected to an opposite end of the shaft for rotating the shaft by hand. Alternatively, the shaft may be equipped with a connection for an ROV.

U.S. Pat. No. 4,915,419 to Robert E. Smith III relates to a sliding lock plate for simultaneously locking together male and female coupling members on opposing junction plates. Various other locking devices have been used or proposed for the purpose of locking together the male and female coupling members attached to junction plates.

U.S. Pat. No. 6,471,250 discloses a junction plate assembly for undersea couplings that uses a sloped cam surface on one of the junction plates and a central shaft having a cam follower that moves up the sloped cam surface to bring the two junction plates together. U.S. patent application Ser. No. 10/806,661 which is commonly assigned to National Coupling Co., Inc. discloses a similar apparatus wherein paired cam surfaces and cam followers permit both a "cam on" and "cam off" functionality.

Flange 34 of the coupling illustrated in FIG. 2 and flange 134 of the coupling shown in FIG. 4 may be used to secure the male coupling member to a junction plate assembly.

Although the invention has been described in detail with reference to certain preferred embodiments, variations and modifications exist within the scope and spirit of the invention as described and defined in the following claims.

What is claimed is:

1. A coupling for tubular goods comprising:
   a female member having a generally cylindrical receiving chamber with an annular cam surface;
   a male member having a generally cylindrical passageway extending from a first end thereof to a second end thereof and a cavity transverse to the passageway;
   a gate for opening and closing the passageway slideably retained in the cavity and having a cam follower that extends from the cavity such that when the male member is inserted into the receiving chamber of the female member, the cam follower, acting on the annular cam surface, moves the gate from a closed position to an open position.

2. A coupling as recited in claim 1 further comprising a spring which exerts an extensive force on the gate such that when the male member is withdrawn from the female member the gate moves from the open position to the closed position.

3. A coupling as recited in claim 1 further comprising a retaining pin in sliding engagement with the gate such that rotation of the gate in the cavity is prevented and extension of the gate is limited.

4. A coupling as recited in claim 1 further comprising a bleed hole connecting the cavity to an external surface of the male member.

5. A coupling as recited in claim 1 further comprising a seal for providing a fluid-tight seal between the female member and the male member.

6. A coupling as recited in claim 1 wherein the annular cam surface is on a seal retainer.

7. A coupling as recited in claim 5 wherein the seal is retained in a wall of the receiving chamber of the female member with a dovetail interfit.

8. A coupling as recited in claim 7 further comprising a seal retainer in threaded engagement with the female member, the seal retainer having a first surface that forms a portion of the dovetail interfit and a second surface that forms the annular cam surface.

9. A coupling as recited in claim 5 wherein the seal is a radial seal that seals between the receiving chamber of the female member and the male member.

10. A coupling as recited in claim 9 wherein the radial seal has a circumferential groove and an O-ring retained within the groove for sealing between the radial seal and the body of the female member.

11. A coupling for tubular goods comprising:
a female member having a generally cylindrical receiving chamber with an inner portion having a smaller internal diameter and an outer portion having a larger internal diameter and a sloped cam surface between the inner and outer portions;
a male member having a generally cylindrical passageway extending from a first end thereof to a second end thereof, a cavity transverse to the passageway, a generally cylindrical probe section with an outer portion dimensioned to fit within the inner portion of the receiving chamber of the female member and an inner portion dimensioned to fit within the outer portion of the receiving chamber of the female member;
a gate for opening and closing the passageway slideably retained in the cavity and having a cam follower that extends from the cavity such that when the male member is inserted into the receiving chamber of the female member, the cam follower, acting on the sloped cam surface, moves the gate from a closed position to an open position.

12. A coupling as recited in claim 11 further comprising a spring that exerts an extensive force on the gate such that when the male member is withdrawn from the female member the gate moves from the open position to the closed position.

13. A coupling as recited in claim 12 further comprising a retaining pin in sliding engagement with the gate such that rotation of the gate in the cavity is prevented and extension of the gate is limited.

14. A coupling as recited in claim 11 further comprising a bleed hole connecting the cavity to an external surface of the male member.

15. A coupling as recited in claim 11 wherein the cavity is within the outer portion of the probe section of the male member.

16. A coupling as recited in claim 11 further comprising a seal for providing a fluid-tight seal between the female member and the male member.

17. A coupling as recited in claim 16 wherein the seal is retained in a wall of the outer portion of the receiving chamber of the female member with a dovetail interfit.

18. A coupling as recited in claim 17 further comprising a seal retainer in threaded engagement with the female member, the seal retainer having an inner surface that forms a portion of the dovetail interfit.

19. A coupling as recited in claim 16 wherein the seal is a radial seal that seals between the receiving chamber and the male member.

20. A coupling as recited in claim 19 wherein the radial seal has a circumferential groove and an O-ring retained within the groove for sealing between the radial seal and the body of the female member.

* * * * *